United States Patent
Zhang et al.

(10) Patent No.: US 11,474,798 B2
(45) Date of Patent: Oct. 18, 2022

(54) METHOD AND SYSTEM FOR OPTIMIZING ACCESS TO CONSTANT MEMORY

(71) Applicant: HUAWEI TECHNOLOGIES CO., LTD., Guangdong (CN)

(72) Inventors: Guansong Zhang, Unionville (CA); Weiwei Li, Toronto (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/000,781

(22) Filed: Aug. 24, 2020

(65) Prior Publication Data

US 2022/0058008 A1    Feb. 24, 2022

(51) Int. Cl.
*G06F 9/44* (2018.01)
*G06F 8/41* (2018.01)

(52) U.S. Cl.
CPC ............ *G06F 8/4434* (2013.01); *G06F 8/441* (2013.01)

(58) Field of Classification Search
CPC ................................ G06F 8/441; G06F 8/4434
USPC ................................................... 717/140–167
See application file for complete search history.

(56) References Cited

U.S. PATENT DOCUMENTS

| | | | | |
|---|---|---|---|---|
| 8,364,739 B2 * | 1/2013 | Baskaran | ................ | G06F 17/16 708/607 |
| 8,789,026 B2 * | 7/2014 | Auerbach | ................ | G06F 8/456 717/140 |
| 8,930,926 B2 * | 1/2015 | Bastoul | ................... | G06F 8/453 717/151 |
| 10,949,182 B2 * | 3/2021 | Venkataramani | ....... | G06F 8/456 |

OTHER PUBLICATIONS

Che et al., "Dymaxion: Optimizing Memory Access Patterns for Heterogeneous Systems", 2011, ACM, 11 pages. (Year: 2011).*
Jang et al., "Exploiting Memory Access Patterns to Improve Memory Performance in Data-Parallel Architectures", 2011, IEEE, pp. 105-118. (Year: 2011).*
Akkas, "Efficient Memory and GPU Operations for Tiramisu Compiler", 2019, MIT, 60 pages. (Year: 2019).*
CUDA Progamming: What is "Constant Memory" in CUDA, 2012, retrieved from http://cuda-programming.blogspot.com/2013/01/what-is-constant-memory-in-cuda.html on Aug. 13, 2020.
AMD; AMD Accelerated Parallel Processing OpenCL Programming Guide; Nov. 2013; retrieved from http://developer.amd.com/wordpress/media/2013/07/AMD_Accelerated_Parallel_Processing_OpenCL_Programming_Guide-rev-2.7.pdf on Aug. 13, 2020.

(Continued)

*Primary Examiner* — Ted T. Vo
(74) *Attorney, Agent, or Firm* — BCF LLP

(57) ABSTRACT

The disclosed systems, structures, and methods are directed to optimizing memory access to constants in heterogeneous parallel computers, including systems that support OpenCL. This is achieved in an optimizing compiler that transforms program scope constants and constants at the outermost scope of kernels into implicit constant pointer arguments. The optimizing compiler also attempts to determine access patterns for constants at compile-time and places the constants in a variety of memory types available in a compute device architecture based on these access patterns.

18 Claims, 7 Drawing Sheets

(56) References Cited

OTHER PUBLICATIONS

Khronos Group; Last Revision Date Nov. 14, 2012; OpenCL Specification, version 1 2; retrieved from https://www.khronos.org/registry/OpenCL/specs/opencl-1.2.pdf on Aug. 13, 2020.
NVIDIA; OpenCL Programming Guide for the CUDA Architecture, Version 4.2; Mar. 9, 2012; retrieved from http://developer.download.nvidia.com/compute/DevZone/docs/html/OpenCL/doc/OpenCL_Programming_Guide.pdf on Aug. 13, 2020.

* cited by examiner

```
__constant int a[8] = {0,1,2,3,4,5,6,7};        ⟵ 702

__kernel void test(__global int* out){          ⟵ 704
    __constant int b[8] = {0,1,2,3,4,5,6,7};    ⟵ 706 for(unsigned idx = 0; i<3; i++){
        out[idx] = a[idx]+ b[idx];              ⟵ 708
    }
}
```
— 700

FIG. 7A

```
__kernel void test(__global int* out,
                   __constant int* in){         ⟵ 752 for(unsigned idx = 2; i<8; i++){
        out[idx] = in[idx];                     ⟵ 754
    }
}
```
— 750

FIG. 7B

METHOD AND SYSTEM FOR OPTIMIZING ACCESS TO CONSTANT MEMORY

CROSS-REFERENCE TO RELATED APPLICATIONS

This is the first filing related to the disclosed technology. At the time of filing, there are no related patents or applications.

FIELD OF THE INVENTION

The present disclosure relates generally to the field of optimization of memory access in heterogeneous parallel architectures, and more particularly to compile-time methods and systems for optimizing access to constant memory in heterogeneous parallel architectures.

BACKGROUND

Current computing architectures used, e.g., in artificial intelligence, data science, and other applications commonly take advantage of one or more central processing units (CPUs), typically having multiple parallel cores, as well as special-purpose processing units, such as graphics processing units (GPUs), digital signal processors (DSPs), tensor processing units (TPUs), field-programmable gate arrays (FPGAs) and other types of processors, which may include tens or even hundreds of special-purpose processors, all of which may run in parallel. Parallel architectures of this sort, in which there may be numerous different kinds of processors, are referred to as heterogeneous parallel architectures.

Developing software that runs on heterogeneous parallel architectures has been challenging. The various processors that are used may each be based on different models of computation, and there may be different types of memory, and so on. Typically, vendors who produced special-purpose processors that are used in heterogeneous parallel systems also provided specialized software development tools, such as compilers, libraries, specialized assemblers, and other tools for working with their hardware. As a result, it was often necessary to rewrite significant blocks of code to move from one heterogeneous parallel computing architecture to another.

OpenCL is one attempt to address these difficulties by providing a common and open framework for writing programs that execute across these heterogeneous parallel computing platforms. OpenCL provides a computing and memory model that provides a standardized interface for parallel computing, including task- and data-based parallelism.

One type of memory used in the OpenCL memory model is referred to as "constant memory." Constant memory stores constants that are used in OpenCL programs, and cannot be written to by the parallel kernels that use these constants. The constants that are stored in constant memory are often arrays of values, accessed using an access index that varies to access the various elements of the array. Constant memory in OpenCL is usually a part of global memory, which may be accessed by all the parallel kernels of a program, and to which access is often relatively slow. In some architectures, the special-purpose processing units may include special on-chip constant memory and/or a constant cache to speed access to constants. However, these features are not available on all architectures, and although most special-purpose architectures include a variety of types of memory which may provide much faster access than global memory, these other types of fast memory are not generally used for storing constants.

SUMMARY

Advantageously, the present disclosure provides an optimizer for use in a compiler to permit constants to be stored in a variety of types of memory in a heterogeneous parallel architecture, including fast and medium-speed memories that would not typically be used for storing constants. Additionally, the disclosed technology permits constants to be stored and accessed from on-chip memory in special-purpose processing units that do not include on-chip constant memory or a constant cache. This can result in significant improvements in the memory performance of heterogeneous parallel computers when accessing constants. Although the disclosure gives examples targeting OpenCL, it will be understood that the disclosed technology can also be used to improve the memory access speed for constants in other heterogeneous parallel architectures.

In accordance with one aspect of the present disclosure, the technology is implemented in an apparatus including a processor, a memory coupled to the processor, and a compiler residing in the memory and executed by the processor. The compiler includes a constant memory optimizer that includes a scope determination module configured to determine a scope of a constant in code for a heterogeneous parallel computer. The constant memory optimizer further includes a code transformation module configured to transform the code to pass the constant as an implicit pointer argument into a kernel in the code that references the constant if the scope of the constant is a program scope or an outermost scope of the kernel.

In some implementations, the constant memory optimizer further includes an access pattern determination module configured to determine an access pattern of the constant in the kernel, and a memory type determination module configured to select a type of memory to be used for the constant based on the access pattern. In some implementations, the code transformation module is further configured to transform the code to use the selected type of memory for the constant In accordance with other aspects of the present disclosure, a method of optimizing access to constants in a heterogeneous parallel computer is provided. The method includes determining a scope of a constant in code for the heterogeneous parallel computer using a scope determination module and transforming the code to pass the constant as an implicit pointer argument to a kernel in the code that references the constant if the scope of the constant is a program scope or an outermost scope of the kernel using a code transformation module. The method also includes determining an access pattern of the constant in the kernel using an access pattern determination module and selecting a type of memory to be used for the constant based on the access pattern using a memory type determination module. Transforming the code also includes transforming the code to use the selected type of memory for the constant.

In some implementations of the method, in a first case in which the scope of the constant is the program scope or the outermost scope of the kernel, determining the access pattern of the constant includes determining a size of the constant. In these selecting the type of memory to be used for the constant may include: selecting a fast memory for the constant in a "small-size" sub-case if the size of the constant is sufficiently small for placement in the fast memory; selecting a medium-speed memory for the constant in a "program scope known access range" sub-case if the size of the constant is too large for placement in the fast memory and if the access pattern includes a known access index range at compile-time; and selecting a normal type of memory used for constants in a "default" sub-case if neither the small-size sub-case nor the program scope known access range sub-case applies.

In some implementations of the method, in a second case in which the constant is a constant pointer argument, two sub-cases may be used for selecting the type of memory to be used for the constant. These two sub-cases include: selecting a fast memory or a medium-speed memory in a "constant pointer known access" sub-case, in which the fast memory is selected for a known access index range of the constant if the access pattern includes the known access index range at compile-time and a size of the known access index range is sufficiently small for placement in the fast memory, and in which the medium-speed memory is selected for the known access index range of the constant if the access pattern includes a known access index range at compile-time and the size of the known access index range is too large for placement in the fast memory; and selecting a normal type of memory used for constant values in a "constant pointer unknown access" sub-case if the access pattern does not include a known access index range at compile-time.

In accordance with still further aspects of the disclosure, the disclosed technology may be implemented as instructions encoded on a computer-readable medium. When these instructions are executed by a processor, they cause the processor to perform operations, including causing the processor to determine a scope of a constant in code for a heterogeneous parallel computer and determine a size and an access pattern of the constant in a kernel in the code. The instructions also cause the processor to select a type of memory to be used for the constant based on the size and access pattern.

In a first case, in which the scope of the constant is the program scope or the outermost scope of the kernel, the instructions cause the processor to select the type of memory according to several sub-cases. If the size of the constant is sufficiently small for placement in the fast memory, then the processor selects a fast memory for the constant in a "small-size" sub-case. If the size of the constant is too large for placement in the fast memory and if the access pattern includes a known access index range at compile-time, then the processor selects a medium-speed memory for the constant in a "program scope known access range" sub-case. Finally, if neither the small-size sub-case nor the program scope known access range sub-case applies, then the processor selects a normal type of memory used for constants in a "default" sub-case.

In a second case, in which the constant is a constant pointer argument, the size of the constant will not be known, so the instructions cause the processor to select the type of memory for the constant according to different sub-cases. The instructions cause the processor to select a fast memory or a medium-speed memory in a "constant pointer known access" sub-case, in which the fast memory is selected for a known access index range of the constant if the access pattern includes the known access index range at compile-time and a size of the known access index range is sufficiently small for placement in the fast memory. The medium-speed memory is selected for the known access index range of the constant if the access pattern includes the known access index range at compile-time and the size of the known access index range is too large for placement in the fast memory. In a "constant pointer unknown access" sub-case, the instructions cause the processor to select a normal type of memory used for constant values if the access pattern does not include a known access index range at compile-time.

Finally, the instructions cause the processor to transform the code to pass the constant as an implicit pointer argument to a kernel in the code that references the constant if the scope of the constant is a program scope or an outermost scope of the kernel and to use the selected type of memory for the constant.

It will be understood that in any of these aspects of the disclosure, the heterogeneous parallel computer may support OpenCL, and transforming the code may include transforming code expressed in an OpenCL intermediate representation, such as SPIR-V (see below) and/or LLVM IR (see below). Further, in any of these aspects, a "fast" memory may include registers in a compute device, and a "medium-speed" memory may include on-chip memory in a compute device, such a shared or local memory.

BRIEF DESCRIPTION OF THE FIGURES

The features and advantages of the present disclosure will become apparent from the following detailed description, taken in combination with the appended drawings, in which:

FIGS. 7A and 7B show example code written in the OpenCL C programming language, to illustrate the scopes of constants that may be subject to the constant memory optimization of the disclosure.

Figure 1:
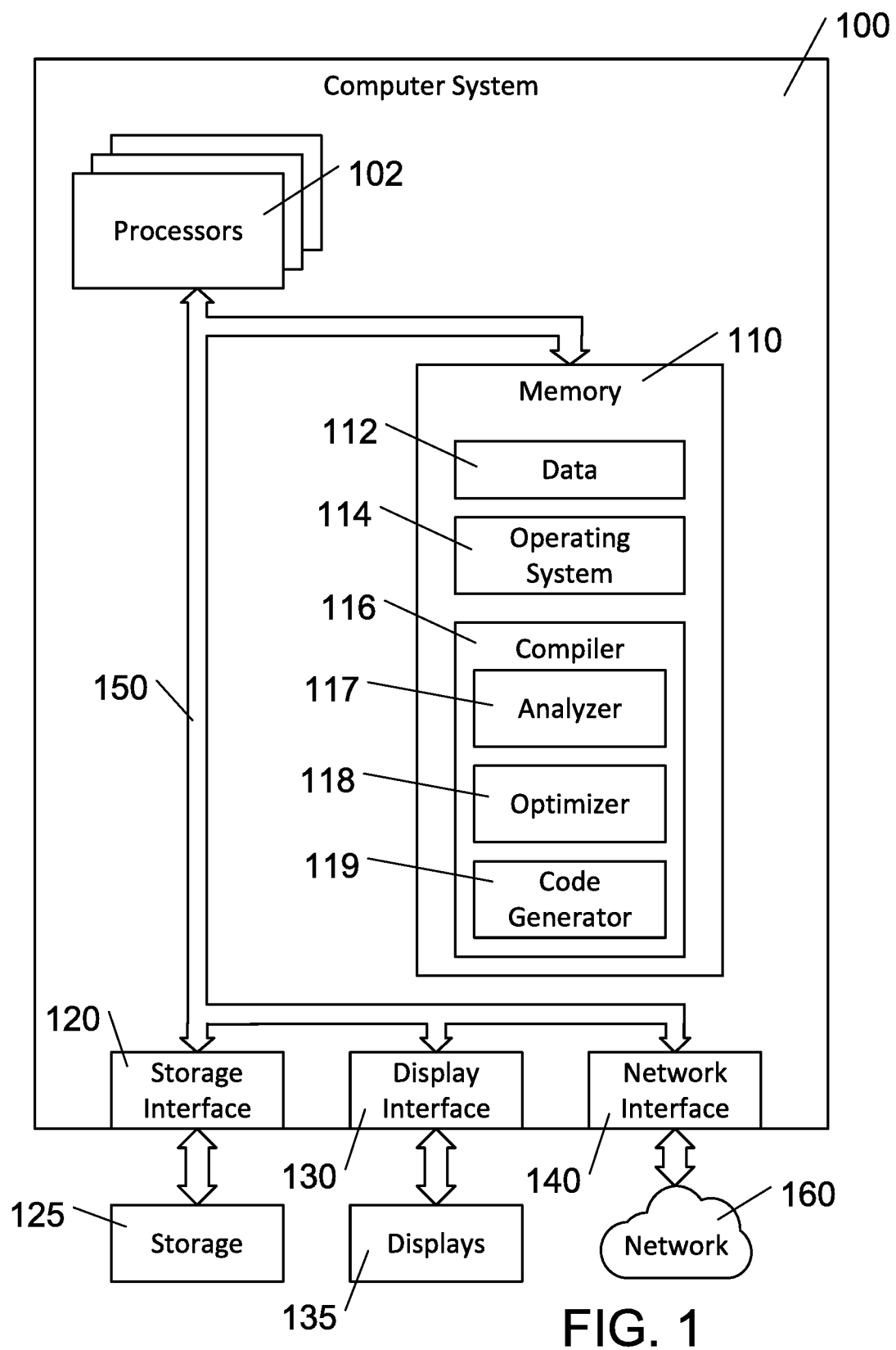
FIG. 1 is a block diagram of a computer system including a compiler that implements the constant memory optimizations of the disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

Various representative embodiments of the disclosed technology will be described more fully hereinafter with reference to the accompanying drawings. The present technology may, however, be embodied in many different forms and should not be construed as limited to the representative embodiments set forth herein. In the drawings, the sizes and relative sizes of layers and regions may be exaggerated for clarity. Like numerals refer to like elements throughout.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. By contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). Additionally, it will be understood that elements may be "coupled" or "connected" mechanically, electrically, communicatively, wirelessly, optically, and so on, depending on the type and nature of the elements that are being coupled or connected.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The functions of the various elements shown in the figures, including any functional block labeled as a "processor," may be provided through the use of dedicated hardware as well as hardware capable of executing instructions, in association with appropriate software instructions. When provided by a processor, the functions may be provided by a single dedicated processor, by a single shared processor, or by a plurality of individual processors, some of which may be shared. In some implementations of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, an application-specific integrated circuit (ASIC), a field-programmable gate array (FPGA), a read-only memory (ROM) for storing software, a random access memory (RAM), and non-volatile storage. Other hardware, conventional and/or custom, may also be included.

Software modules, or simply modules or units which are implied to be software, may be represented herein as any combination of flowchart elements or other elements indicating the performance of process steps and/or textual description. Such modules may be executed by hardware that is expressly or implicitly shown. Moreover, it should be understood that a module may include, for example, but without limitation, computer program logic, computer program instructions, software, stack, firmware, hardware circuitry, or a combination thereof, which provides the required capabilities. It will further be understood that a "module" generally defines a logical grouping or organization of related software code or other elements as discussed above, associated with a defined function. Thus, one of ordinary skill in the relevant arts will understand that particular code or elements that are described as being part of a "module" may be placed in other modules in some implementations, depending on the logical organization of the software code or other elements, and that such modifications are within the scope of the disclosure as defined by the claims.

It should also be noted that as used herein, the term "optimize" means to improve. It is not used to convey that the technology produces the objectively "best" solution, but rather that an improved solution is produced. In the context of memory access, it typically means that the efficiency or speed of memory access may be improved.

As used herein, the term "determine" generally means to make a direct or indirect calculation, computation, decision, finding, measurement, or detection. In some cases, such a determination may be approximate. Thus, determining a value indicates that the value or an approximation of the value is directly or indirectly calculated, computed, decided upon, found, measured, detected, etc. If an item is "predetermined" it is determined at any time prior to the instant at which it is indicated to be "predetermined."

The present technology may be implemented as a system, a method, and/or a computer program product. The computer program product may include a computer-readable storage medium (or media) storing computer-readable program instructions that, when executed by a processor, cause the processor to carry out aspects of the disclosed technology. The computer-readable storage medium may be, for example, an electronic storage device, a magnetic storage device, an optical storage device, an electromagnetic storage device, a semiconductor storage device, or any suitable combination of these. A non-exhaustive list of more specific examples of the computer-readable storage medium includes: a portable computer disk, a hard disk, a random access memory (RAM), a read-only memory (ROM), a flash memory, an optical disk, a memory stick, a floppy disk, a mechanically or visually encoded medium (e.g., a punch card or bar code), and/or any combination of these. A computer-readable storage medium, as used herein, is to be construed as being a non-transitory computer-readable medium. It is not to be construed as being a transitory signal, such as radio waves or other freely propagating electromagnetic waves, electromagnetic waves propagating through a waveguide or other transmission media (e.g., light pulses passing through a fiber-optic cable), or electrical signals transmitted through a wire.

It will be understood that computer-readable program instructions can be downloaded to respective computing or processing devices from a computer-readable storage medium or to an external computer or external storage device via a network, for example, the Internet, a local area network, a wide area network and/or a wireless network. A network interface in each computing/processing device may receive computer-readable program instructions via the network and forwards the computer-readable program instructions for storage in a computer-readable storage medium within the respective computing or processing device.

Computer-readable program instructions for carrying out operations of the present disclosure may be assembler instructions, machine instructions, firmware instructions, configuration data for integrated circuitry, or either source code or object code written in any combination of one or more programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network.

All statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable program instructions. These computer-readable program instructions may be provided to a processor or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowcharts, flow diagrams, state transition diagrams, pseudo-code, and the like.

The computer-readable program instructions may also be loaded onto a computer, other programmable data processing apparatus or other devices to cause a series of operational steps to be performed on the computer, other programmable apparatus or other devices to produce a computer-implemented process, such that the instructions which execute on the computer, other programmable apparatus, or other device implement the functions/acts specified in the flowcharts, flow diagrams, state transition diagrams, pseudo-code, and the like.

In some alternative implementations, the functions noted in flowcharts, flow diagrams, state transition diagrams, pseudo-code, and the like may occur out of the order noted in the figures. For example, two blocks shown in succession in a flowchart may, in fact, be executed substantially concurrently, or the blocks may sometimes be executed in the reverse order, depending upon the functionality involved. It will also be noted that each of the functions noted in the figures, and combinations of such functions can be implemented by special-purpose hardware-based systems that perform the specified functions or acts or by combinations of special-purpose hardware and computer instructions.

With these fundamentals in place, we will now consider some non-limiting examples to illustrate various implementations of aspects of the present disclosure.

FIG. 1 shows a computer system 100 that includes a compiler 116, as described in greater detail below. As will be understood by one of ordinary skill in the art, a compiler, such as the compiler 116, is generally a computer program that translates computer code written is one programming language (referred to as the "source code", written in the "source language") into computer code in another programming language (the "object code" or "target code", expressed in the "target language"). Typically, the source language will be a relatively "high-level" language (i.e., a language that can be read by humans possessing knowledge of the programming language), such a "C", "C++", "Java", "Rust", "Go", or many others. The target language will often be a binary "machine language" that can be executed by a computer implementing a particular hardware architecture. Alternatively, the target language may be an intermediate form, that, while closer to machine language than the source language, still is not specific to a single hardware architecture. In some cases, the target language may even be a different high-level language.

The computer system 100 may be a multi-user server or computer, a single user computer, a laptop computer, a tablet computer, a smartphone, an embedded control system, or any other computer system currently known or later developed. As shown in FIG. 1, the computer system 100 includes one or more processors 102, a memory 110, a storage interface 120, a display interface 130, and a network interface 140. These system components are interconnected via a bus 150.

The memory 110 may contain data 112, an operating system 114, and a compiler 116. The data 112 may be any data that serves as input to or output from any program in the computer system 100. The operating system 114 is an operating system such as MICROSOFT WINDOWS or LINUX. The compiler 116 includes an analyzer 117, which generates an intermediate representation from a human-readable source language, an optimizer 118, which optimizes code in the intermediate representation, and a code generator 119, which typically generates assembly or machine code that may be executed by a target computer. Notably, the optimizer 118 may include code that optimizes memory access to constant values in a heterogeneous parallel architecture, as is described in greater detail below. It will be understood by those of ordinary skill in the art that although the compiler 116 is shown as executing on the computer system 100, it is possible that the compiler 116 could execute on numerous computer systems, connected, e.g., by a network. Further, the analyzer 117, optimizer 118, and code generator 119 may reside on different computer systems. Additionally, it will be understood that although the compiler 116 is shown as executing on the computer system 100, the code that is generated by the compiler 116 need not be targeted to the computer system 100, but could instead be code for a different computer system architecture.

The storage interface 120 is used to connect storage devices, such as the storage device 125, to the computer system 100. One type of storage device 125 is a solid-state drive, which may use an integrated circuit assembly to store data persistently. A different kind of storage device 125 is a hard drive, such as an electro-mechanical device that uses magnetic storage to store and retrieve digital data. Similarly, the storage device 125 may be an optical drive, a card reader that receives a removable memory card, such as an SD card, or a flash memory device that may be connected to the computer system 100 through, e.g., a universal serial bus (USB).

In some implementations, the computer system 100 may use well-known virtual memory techniques that allow the programs of the computer system 100 to behave as if they have access to a large, contiguous address space instead of access to multiple, smaller storage spaces, such as the memory 110 and the storage device 125. Therefore, while the data 112, the operating system 114, and the compiler 116 are shown to reside in the memory 110, those skilled in the art will recognize that these items are not necessarily wholly contained in the memory 110 at the same time.

The processors 102 may include one or more microprocessors and/or other integrated circuits. The processors 102 execute program instructions stored in the memory 110. When the computer system 100 starts up, the processors 102 may initially execute a boot routine and/or the program instructions that make up the operating system 114. The processors 102 may also execute instructions that make up the compiler 116.

The display interface 130 is used to connect one or more displays 135 to the computer system 100. These displays 135, which may include, e.g., terminals, monitors, keyboards, pointer devices, touchscreens, and/or other human interface devices, provide the ability for users to interact with the computer system 100. Note, however, that although the display interface 130 is provided to support communication with one or more displays 135, the computer system 100 does not necessarily require a display 135, because all needed interaction with users may occur via the network interface 140.

The network interface 140 is used to connect the computer system 100 to other computer systems or networked devices (not shown) via a network 160. The network interface 140 may include a combination of hardware and software that allows communicating on the network 160. The software in the network interface 140 may include software that uses one or more network protocols to communicate over the network 160. For example, the network protocols may include TCP/IP (Transmission Control Protocol/Internet Protocol). In some implementations, the network interface 140 may be an Ethernet adapter.

It will be understood that the computer system 100 is merely an example and that the compiler and optimizer according to the disclosed technology be execute on computer systems or other computing devices having different configurations.

Figure 2:
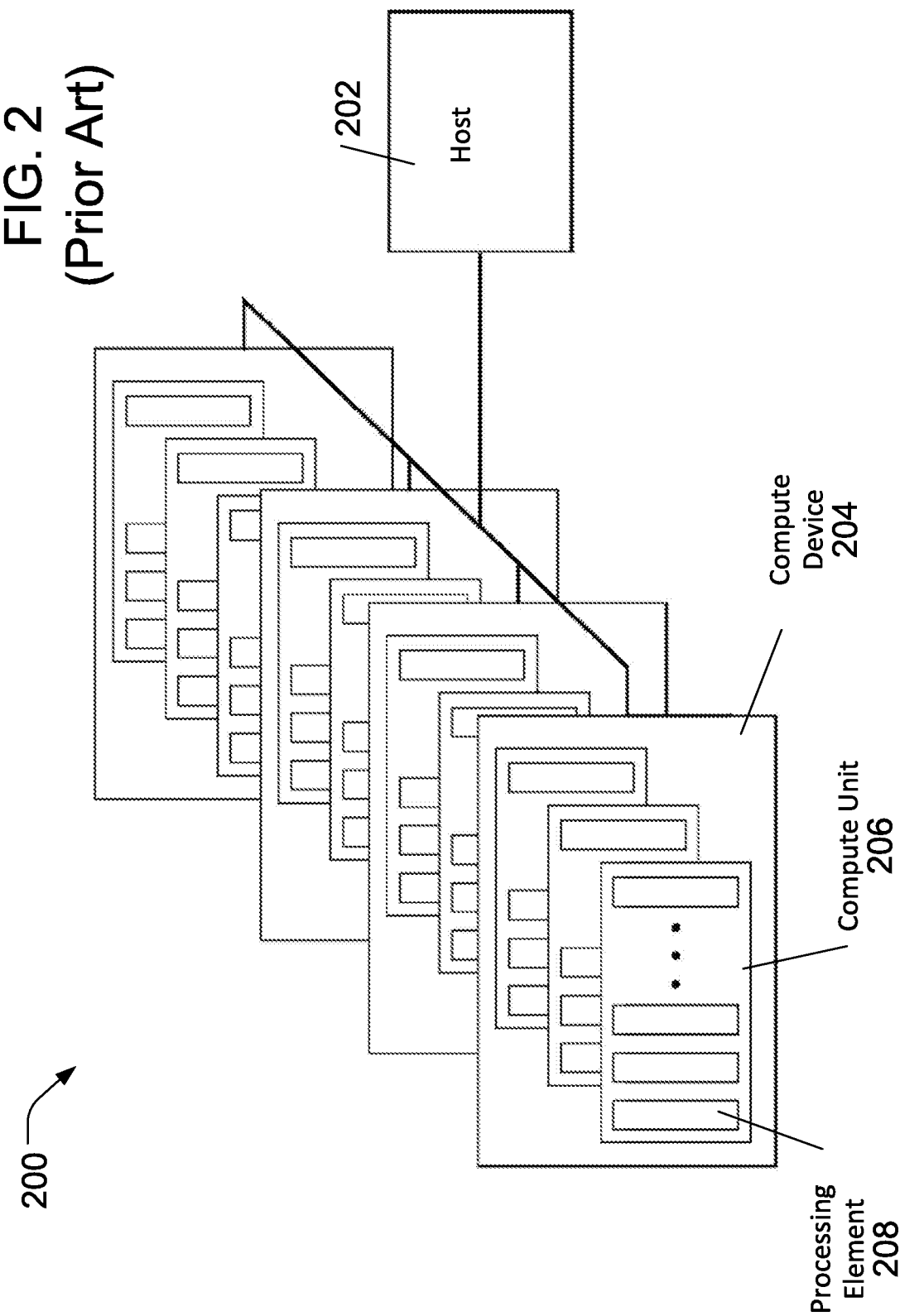
FIG. 2 (prior art) is a block diagram of a heterogeneous parallel computing system that conforms to an OpenCL model.

FIG. 2 shows a block diagram of an example heterogeneous parallel computing system 200 of the type that the compiler and optimizer of the present disclosure are intended to target. It will be understood that the compiler and optimizer may operate on the same computer system or architecture for which they generate code or may run on a different system and/or architecture. In either case, the code that is generated is intended to execute on a heterogeneous parallel computing system 200, such as is shown in FIG. 2.

The heterogeneous parallel computing system 200 shown in FIG. 2 conforms to an OpenCL system model. Throughout the disclosure, terminology and system and memory models associated with OpenCL will be used. It will, however, be understood that the principles described herein may be applied to any heterogeneous parallel computing system and are not limited solely to OpenCL. It will further be understood that the heterogeneous parallel computing system 200 shown in FIG. 2 represents a logical model for heterogeneous parallel computing and that there may be variation in the manner that this logical model is mapped onto a physical implementation of a heterogeneous parallel computer.

The heterogeneous parallel computing system 200 includes a host 202, which communicates with one or more compute devices 204. Each compute device 204 includes one or more compute units 206, and each compute unit 206 includes one or more processing elements 208. In accordance with the OpenCL model, the computing system 200 may include any number of compute devices 204, compute units 206, and processing elements 208.

The host 202 is a computer system that executes a host program, which defines the context for and manages the execution of one or more kernels. These kernels are functions that execute on one or more compute devices 204. The host 202 queues commands to the compute devices 204, which may include, for example, executing a kernel or reading and writing memory objects.

The compute devices 204 are devices connected to the host 202 that are capable of performing computing functions in parallel with each other and with the host 202. Examples of compute devices 204 include GPUs, DSPs, multi-core CPUs, TPUs, and other similar devices. Each compute device 204 may execute one or more kernels that are provided by the host 202.

Within a compute device 204, parallel instances of a kernel define work items that execute on the processing elements 208 and are organized into work groups, each of which executes on a compute unit 206. The processing elements 208 within a single compute unit 206 execute a single stream of instructions (i.e., the instructions associated with a kernel) either as single instruction multiple data (SIMD) units, in which the processing elements 208 operate in lockstep but on different data elements, or as single program multiple data (SPMD) units, in which each of the processing elements 208 maintains its own program counter.

Figure 3:
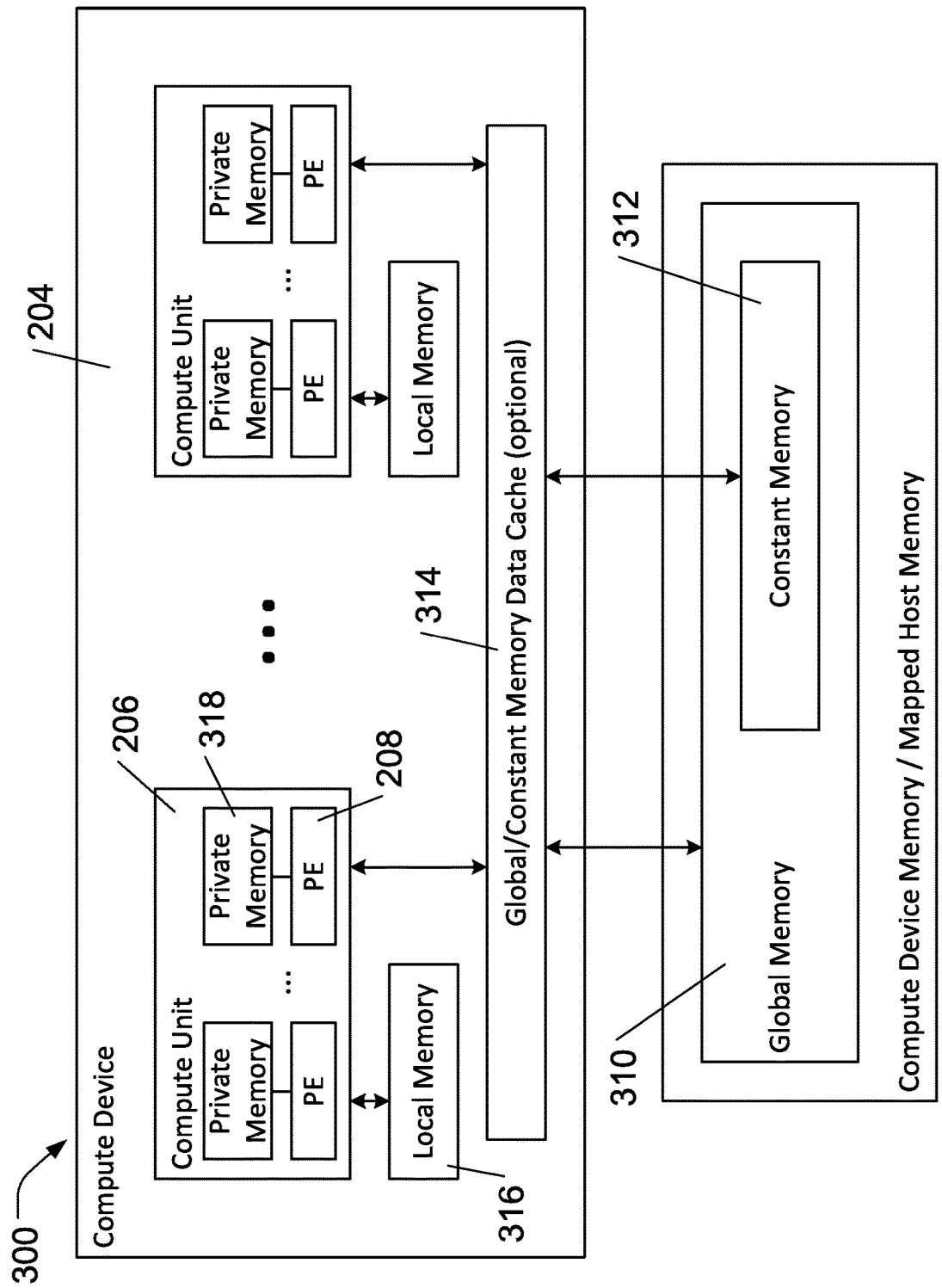
FIG. 3 (prior art) illustrates a memory model for a heterogeneous parallel computing system that conforms to OpenCL.

FIG. 3 shows a block diagram of a memory model 300 for use in a heterogeneous parallel computing system. As with the computing system 200 described above with reference to FIG. 2, the memory model 300 conforms to an OpenCL model. It will be understood that the principles disclosed herein may be used with other memory models and are not limited to OpenCL. It will further be understood that the memory model 300 represents a logical memory model and that there will be variation in how this logical model may be mapped onto a physical memory architecture.

The memory model 300 includes a global memory 310, which is allocated from a global memory pool (not shown) and may be mapped from a region of memory of a host device (not shown in FIG. 3). Global memory 310 may be dynamically allocated (i.e., allocated at run-time) by the host, and may be read or written by the host. A kernel generally cannot allocate space in the global memory 310 (with the exception of constant memory—see below) but can read or write to the global memory 310.

A constant memory 312 is an area allocated within the global memory 310, which may be accessed as read-only variables within a kernel. These read-only variables may be accessed by all the work items of a kernel during the kernel's execution. Space in the constant memory 312 may be dynamically allocated by the host or statically allocated (i.e., at compile-time) by a kernel. Unlike a kernel, the host can read and write constant memory 312.

In some systems, data accessed from the global memory 310 and the constant memory 312 can be cached in a global/constant memory data cache 314. This facilitates faster access to portions of global memory 310, and constant memory 312 from kernels executing on a compute device 204.

A local memory 316 is a memory region local to a work group, which can be accessed for both reading and writing by all the work items within a work group. In some systems (as shown in FIG. 3), the local memory 316 may be implemented as dedicated regions of memory on a compute device 204, or within a compute unit 206. In other systems, the local memory 316 may be mapped onto portions of the global memory 310. The local memory 316 may be allocated statically within a kernel, or the host can issue commands at run-time that cause local memory 316 to be dynamically allocated. While it is possible for the host to cause local memory 316 to be allocated, the host is not able to read or write the local memory 316.

A private memory 318 is a region of memory that is private to a particular work-item (executing on a processing element (PE), as described above). Variables within a private memory 318 are not visible to other work items. Since a work-item is a parallel instance of a kernel, in some sense, a kernel (i.e., a particular running parallel instance of a kernel) can read and write in private memory 318, and can statically allocate space in private memory 318. The host has no access to read, write, or allocate private memory 318. Generally, private memory 318 can be implemented as a dedicated region of memory within a compute unit 206, or within a processing element 208.

It will be understood that the principal focus of the present disclosure is compile-time optimization of access to constant memory 312. Since constant memory in OpenCL is a part of the global memory, which is generally the slowest type of memory for an executing work-item to access, such optimization can result in significant gains in speed.

Figure 4:
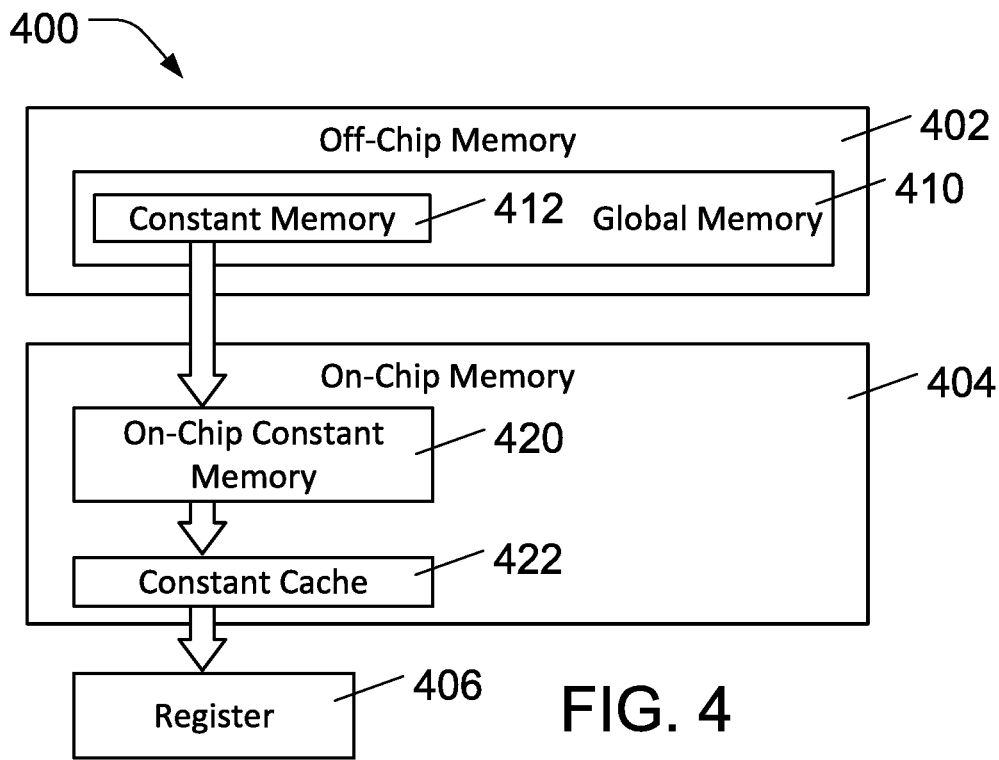
FIG. 4 (prior art) shows a memory hierarchy for speeding up access to constant memory in an architecture that includes on-chip constant memory and a constant cache.

In practice, many vendors of GPUs and other OpenCL compute devices already achieve somewhat faster access to constant memory by providing limited on-chip constant memory on their devices, as well as a constant cache. An example of such a memory hierarchy is shown in FIG. 4.

As can be seen, the memory hierarchy 400 includes off-chip memory 402, on-chip memory 404, and a register 406 that may be directly and quickly accessed by a processor. The off-chip memory 402 includes an off-chip global memory 410, including off-chip constant memory 412. The off-chip memory 402 may be memory that is mapped from the host's memory or other memory that is not on the same physical integrated circuit as the compute device. The on-chip memory 404 includes an on-chip constant memory 420 and a constant cache 422.

At run-time, constants are moved from host memory or the off-chip constant memory 412 into the on-chip constant memory 420. The compiler generally arranges for kernels to access constants from the on-chip constant memory 420. As constants are accessed from the on-chip constant memory 420, they may be cached in the constant cache 422. This means that where the same access index of a constant array is accessed repeatedly within a kernel, access will be fast since the value at that constant access index will likely be cached in the constant cache 422. Access may also be relatively fast where the access index is itself constant or is a compile-time known value, since these constants can be placed in the on-chip constant memory 420, and the compiler can arrange for them to be accessed from the on-chip constant memory 420. However, where the access index to a constant is dynamic (i.e., it changes at run-time), access time may be slow since the constant value may need to be accessed from the off-chip constant memory 412.

Thus, loading from constant memory is inefficient when the access index is not known at compile-time, particularly when there is a thread-variant index. Further, the scheme outlined above in FIG. 4 is intended to use the same memory types for all constants, regardless of whether other memory types could be used. This limits the ability to optimize access to constant memory across a variety of architectures and is particularly poor when used on architectures that do not have an on-chip constant memory or constant cache, but that may support other types of fast, on-chip memory.

In accordance with the principles of the present disclosure, a compiler can take advantage of different types of memory that may be available in a particular compute device architecture by making "intelligent" decisions about the types of memory that should be used for constants. For example, because constants are often relatively small, fast on-chip memories that can store only small amounts of data, such as register banks, could be used for storing some constants. If the compiler can determine access patterns for constants at compile-time, a variety of memory placement schemes can be used even with constants accessed using a dynamic access index. The read-only nature of constant memory further enhances opportunities to optimize access to constant memory in heterogeneous parallel computing systems. Because constant memory cannot be written, there should be no problems with race conditions (i.e., inconsistent or anomalous behavior due to the timing of events, such as multiple processors writing different values to the same memory) or other issues that can cause parallel code to produce unpredictable results, and which can make optimization much more complex. The worst case is only that access to constants will be as slow as it was without optimization.

Unlike the GPU memory hierarchy discussed above with reference to FIG. 4, the disclosed technology does not use a consistent memory placement or hierarchy for constants. Instead, the compiler decides the data placements of constants, which could be, e.g., in various types of on-chip fast-access memories. At run-time, constants are loaded from the host or off-chip constant memory into the memories that have been specified by the compiler. The compiler also arranges the code so that instances of a kernel load constants from the selected types of memories, which may involve using the proper types of load instructions, depending on the memory type that the compiler has selected. Because the compiler has the flexibility to control the placement of constant data, it can arrange constants to increase the speed of accessing constants, and can also accommodate mapping a logical memory model such as was shown in FIG. 3 onto underlying memory systems that have very different architectures, and that may, e.g., lack on-chip constant memory or a constant cache.

In accordance with the disclosure, there are two technological features in the optimizer that enable these benefits. First, constant values that are in the outer scope of a program or that are in the outermost scope of a kernel are transformed into implicit arguments that point to constants in the kernels from which the constants are visible. This changes these constant values in the code, which would ordinarily be placed into a predetermined data segment (typically constant memory) into pointers to constants, which can point to any type of memory. The second technological feature that is used to achieve the disclosed optimization is analyzing access patterns of constants to permit constants that are accessed through dynamic access indices to be placed in faster types of memory than constant memory, provided that the access pattern can be determined at compile-time.

Figure 5:
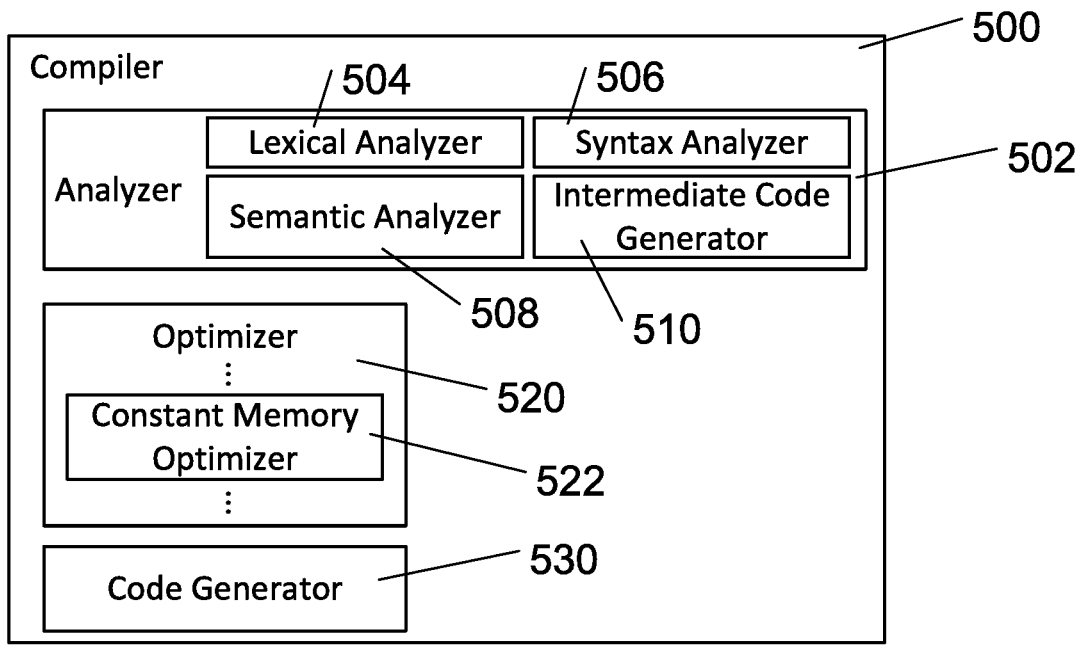
FIG. 5 illustrates a compiler including the constant memory optimizer of the disclosure.

FIG. 5 shows a block diagram of a compiler in accordance with one implementation of the technology. The compiler 500 includes an analyzer module 502, an optimizer module 520, and a code generator module 530.

The analyzer module 502 includes a lexical analyzer module 504, a syntax analyzer module 506, a semantic analyzer module 508, and an intermediate code generator module 510. The analyzer module 502 translates source code in a high-level language, such as "C" or "C++" into an intermediate representation. While the details of the analyzer module 502 and its component sub-modules will vary depending on the high-level language that is being compiled and the intermediate representation that is being used, the operation and implementation of the analyzer module 502 follows well-known principles of compiler design and could be implemented according to these principles by one of ordinary skill in the art. It will be understood that for OpenCL, the analyzer module 502 generally translates from a modified version of the "C" programming language known as the "OpenCL C programming language" (though other high-level languages may also be supported in OpenCL) to an OpenCL intermediate representation such as the "Standard Portable Intermediate Representation" (SPIR, the current release of which is known as SPIR-V 1.5) and/or LLVM IR (an intermediate representation defined as part of the LLVM Compiler Infrastructure, an open source project administered by the LLVM Foundation).

Once the source code has been translated to an intermediate representation, the intermediate representation undergoes a variety of optimizations in the optimizer module 520. In accordance with an implementation of the technology of the present disclosure, the optimizer module includes a constant memory optimizer 522, which optimizes access to constant memory. It will be understood that the optimizer module 520 may include many other optimizations. However, since one non-exclusive focus of the present disclosure is on constant memory optimization, this is the optimization that will be described in the greatest detail herein. It will also be understood that the constant memory optimizer 522 may optimize the intermediate representation using information on the particular heterogeneous parallel computer architecture and memory architecture that is being targeted, so that the optimizations may affect not only the intermediate representation, but also the later process of converting the intermediate representation into assembly and/or machine code in the code generator module 530.

The code generator module 530 translates from the optimized intermediate representation code to output code in, e.g., an assembly language or machine code. The output code may be ready to execute or may need to undergo further steps, such as linking or even further compilation to execute on a target computer. The output code may be specific to a target architecture and/or memory model. In some implementations, the constant memory optimizer 522 may provide information beyond the optimized intermediate representation to the code generator module 530, to instruct the code generator module 530 to use the proper assembly or machine code instructions to access selected types of memory, and/or to mark the assembly to notify the OpenCL driver of the memory placement decision for the constant.

The details of generating assembly or machine code from an optimized intermediate representation code will vary, depending on the intermediate representation and the target architecture. The methods of generating assembly or machine code from an intermediate representation are generally well-known to those of ordinary skill in the art. It will further be understood that in some implementations, the code generator module 530 may produce code in another intermediate representation, or even in a different high-level programming language rather than generating assembly or machine code.

It will be understood that in some implementations, the structure for the compiler shown in FIG. 5 may vary. For example, in some implementations, portions of the optimization could be performed on the source code, rather than on the intermediate representation. In such implementations, there may be some optimizations, possibly including parts of the constant memory optimizer, that would take place within an optimization sub-module (not shown) of the analyzer module 502.

Figure 6:
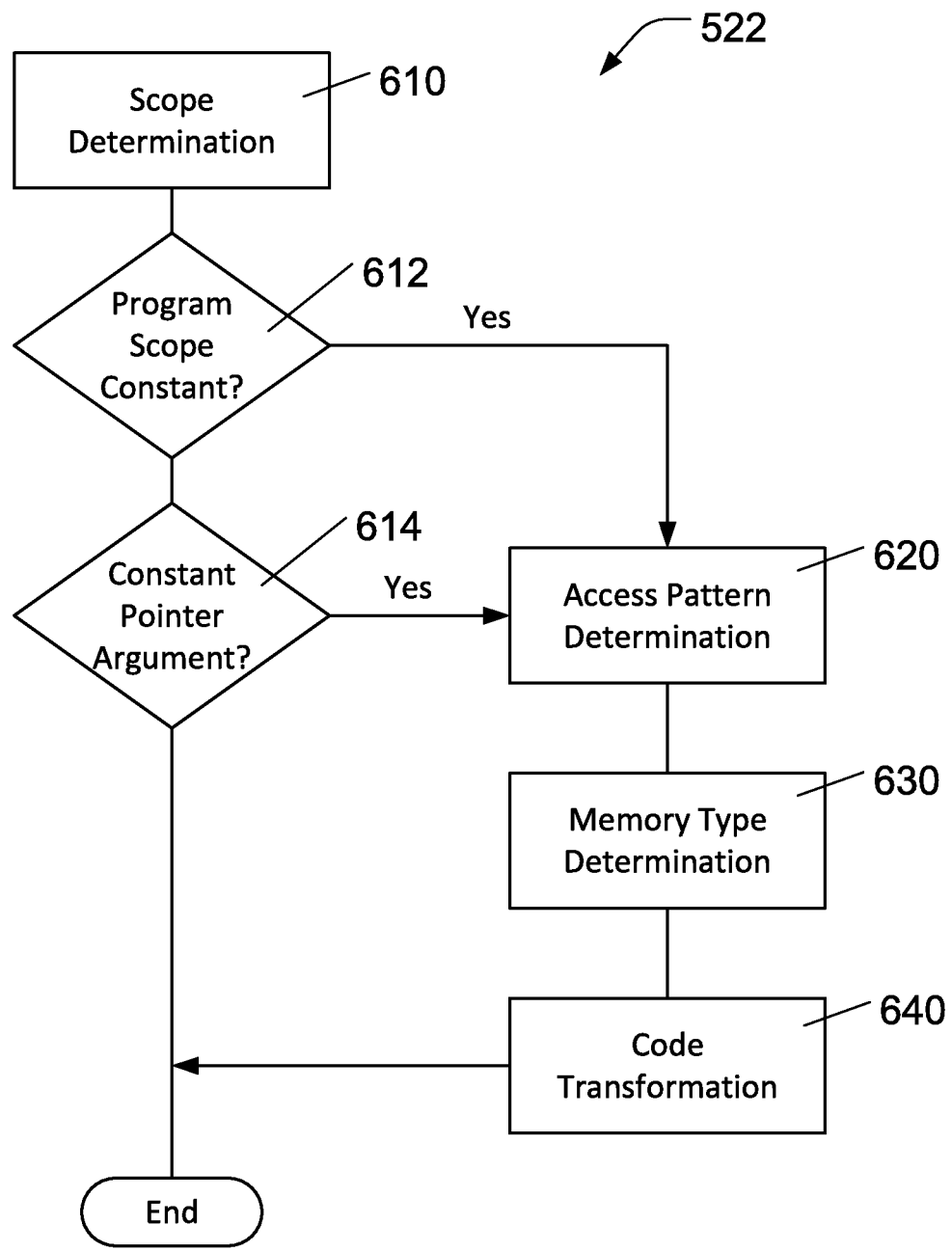
FIG. 6 is a flow diagram showing the operation of the constant memory optimizer of the disclosure.

Referring now to FIG. 6, the operation of the constant memory optimizer 522 is described in greater detail. The constant memory optimizer includes a scope determination module 610, an access pattern determination module 620, a memory type determination module 630, and a code transformation module 640.

The scope determination module determines the scope of a constant value in a program. Used in this context, the "scope" of a constant refers to the visibility of the constant in the program—i.e., which parts of a program can see or use the constant value. The nature of the optimization and the type of memory that is used for storing constant values may be different for constants that are program scope constants or constants at the outermost scope of a kernel than for constant pointer arguments that are passed (i.e., sent or transferred) into a kernel.

In FIG. 7A, an example block of code 700 written in the OpenCL C programming language, is shown to illustrate program scope constants and constants that are at the outermost scope of a kernel. In the code 700, line 702 shows a declaration of a program scope constant array "a" of eight integers. This constant is a program scope constant because it is visible (and usable) throughout the program. Line 704 declares a kernel named "test," and line 706 shows a declaration of a constant array "b" having eight items in the outermost scope of the kernel "test." This means that the entire constant array "b" can be accessed by all work items that execute the kernel "test."

In FIG. 7B, an example block of code 750 written in the OpenCL C programming language, is shown to illustrate a constant pointer argument. Line 752 shows the declaration of a kernel called "test." The kernel has two arguments. The first is called "out," and is a pointer to an integer in global memory. The second argument is called "in" and is a constant pointer argument—in this case, a pointer to an integer constant. It should be noted that a pointer can be accessed using an access index, like an array, so the constant pointer argument "in" effectively points to an array of constants. Based on the pointer, however, we do not know the size of this array.

Referring back to FIG. 6, in some implementations, the scope determination module 610 examines the declarations of constants to determine whether they are: (a) program scope constants or constants in the outermost scope of a kernel; or (b) constant pointer arguments. Given the information that is typically available in an intermediate representation, making this determination may be performed by a scan looking for intermediate representation operations declaring constants and kernel argument types.

In a first case 612, if the constant is either a program scope constant or a constant in the outermost scope of a kernel, then the access pattern determination module 620 will be entered with this information, which will permit the size of the constant to be determined. This will also influence the memory type determination module 630 (e.g., since the size of the constant can be used to determine the memory type), and the code transformation module 640 (since the code should be transformed to pass a pointer to the constant in the selected memory type into the kernel as an implicit argument). It will be understood that in this context, the "size" of a constant or array refers to its size in memory, i.e., the amount of memory that is used to store the constant or the array. Similarly, the size of a memory refers not to the memory's physical size, but rather to how much data it is capable of storing.

In a second case 614, if the constant is a constant pointer argument, then the access pattern determination module 620 will be entered with this information, which means that the size of the constant will not be known. This will also affect the memory type determination module 630 and the code transformation module 640, as described in greater detail below.

If the constant is not any of a program scope constant, a constant at the outermost scope of a kernel, or a constant pointer argument, then in the implementation shown in FIG. 6, the constant memory optimizer 522 will not handle further memory access optimization for that constant. It will be understood, however, that this does not preclude other optimizers (not shown) from performing optimizations with respect to these constants.

Next, in the access pattern determination module 620, the optimizer 522 will attempt to find a range of access indices on the constant that will be used in a kernel. This can be done at compile-time by looking for constant access indices when the constant is used in the kernel, or by looking in a kernel for access indices to the constant that are, e.g., associated with a loop counter, in which case the loop counter can be used to determine which access indices will be used to access the constant. More generally, the access pattern determination module 620 can look for the use of a variable (or a linear function of a variable) as an access index to the constant, in which the values of the variable follow a known finite sequence. In an intermediate representation suitable for parallel computing, such as SPIR-V and/or LLVM IR, much of this information may be readily available since there will typically be loop operations, and there may be operations or hints that provide information on splitting loop iterations into work items. Such information may expose variables that are used as access indices and their ranges.

As examples of access indices with ranges that should be determinable at compile-time, in FIG. 7A, the loop 708 has a loop counter called "idx" which is used as an access index to the constant arrays "a" and "b." As found in the limits of the loop, "idx" will range from 0 to 2, which will also be the access index range for both "a" and "b" in this kernel. Similarly, the loop 754 in FIG. 7B has a loop counter "idx" which will range from 2 to 7. Since "idx" is also used as the access index for the constant pointer argument "in," the access index range for "in" will be 2 to 7.

It will be understood that in some instances, the access pattern determination module 620 may be unable to determine an access pattern or access index range for a constant. For example, where the access index is a variable that results from a complex calculation or is otherwise not following a readily discernable sequence, the access pattern determination module 620 may not be able to determine the access pattern or access index range at compile-time.

In one implementation, if the constant is a program scope constant or a constant in the outermost scope of the kernel, then the access pattern determination module 620 determines the size of the constant, and analyzes the access indices used to access the constant (see above) to attempt to determine, at compile-time, an access index range for the constant. Assuming that the access index range could be determined, then the size and access index range are forwarded to the memory type determination module 630. If no access index range could be determined, then the size information, along with an indicator that the access index range could not be determined, are forwarded to the memory type determination module.

If the constant is a constant pointer argument, then the access pattern determination module 620 will not be able to determine the total size of the constant at compile-time. Accordingly, the access pattern determination module 620 will analyze the access indices used to access the constant (see above) to attempt to determine, at compile-time, an access index range for the constant. Assuming that the access index range could be determined, then it is forwarded to the memory type determination module 630. If no access index range could be determined, then an indicator that the access index range could not be determined is forwarded to the memory type determination module.

It should be noted that in the implementation described above, the access pattern determination module 620 determines the access index range for the constant. In some implementations, the access pattern determination module 620 could determine other access pattern information, such as the sequence of access indices used to access the constant. Such changes would, of course, also affect the memory type determination module 630 and code transformation module 640.

In the memory type determination module 630, the optimizer 522 determines the type of memory that will be used to store the constant. For purposes of describing these memory types, general descriptors, such as "fast memory," "medium-speed memory," and "normal memory" are used. These terms are used to broadly describe the types of memory that will generally be available in a memory system architecture. The exact type, however, may vary according to the underlying architecture. Since the optimizer 522 may produce code that is specific to an underlying memory system architecture, it can select the type of memory that is used in that particular architecture.

In general, fast memory is on-chip memory that can be accessed very quickly by a processor (i.e., the GPU, DSP, or other compute device) but is typically relatively small in size. For example, fast memory may be registers in a GPU. Typically, registers are on-chip high-speed multi-ported static RAM that can be accessed directly and extremely quickly by a processor. While there are relatively few of these registers compared to other memory types, a typical GPU may still have one or more register banks, each of which may include thousands of registers. Depending on how large a constant is, and how many registers are available, it may be possible to store the constant in registers. The compiler will need to keep track of the allocation of registers, making sure that any constants that are placed in registers are sufficiently small to fit into the available registers, while still leaving enough registers for the processors in, e.g., a GPU, to carry out other operations that require use of registers. The size that is considered "sufficiently small" will vary with the number of registers supported in a particular architecture. Accordingly, in an architecture that supports 16K registers, a constant that is "sufficiently small" to be placed in registers may be much larger than a constant that is "sufficiently small" to be placed in registers in an architecture that supports only 1K registers. While registers are described here as fast memory, it will be understood that there may be other kinds of fast memory on a compute device, the common characteristics of such memory being its high-speed access (often the fastest type of memory available on-chip in a given architecture) and small size (at least relative to other kinds of memory).

Medium-speed memory refers to memory that is slower to access than "fast memory" but faster than the "normal" (e.g., global) memory in which constants are stored. Medium-speed memory will generally be on-chip memory in a GPU, DSP, or other compute device. On a GPU, for example, the medium-speed memory may be on-chip shared or local memory or other on-chip memory. This memory tends to be considerably larger—often by orders of magnitude—than fast memory, but still may be limited compared to off-chip memory. As with fast memory, the medium-speed memory is a limited resource, so the constants that are stored in the medium-speed memory may still need to be of a known limited size. The limits on the size of the constants that may be stored in the medium-speed memory will vary with the size of the medium-speed memory in a given architecture. It will further be understood that some architecture may support multiple types of on-chip memory that operates at a "medium" speed. In some implementations, any or all of these types of memory may be used as medium-speed memory.

Normal memory here refers to the type of memory that is normally used for constants. Often, this will be off-chip memory with relatively slow access speeds. However, it is also possible, depending on the target memory system architecture, for other types of memory to be used. In some implementations, this may be memory on the host that has been mapped to permit access to a compute device, such as a GPU. The normal memory is generally very large—currently typically measured in gigabytes—but has relatively slow access times.

Figure 8A:
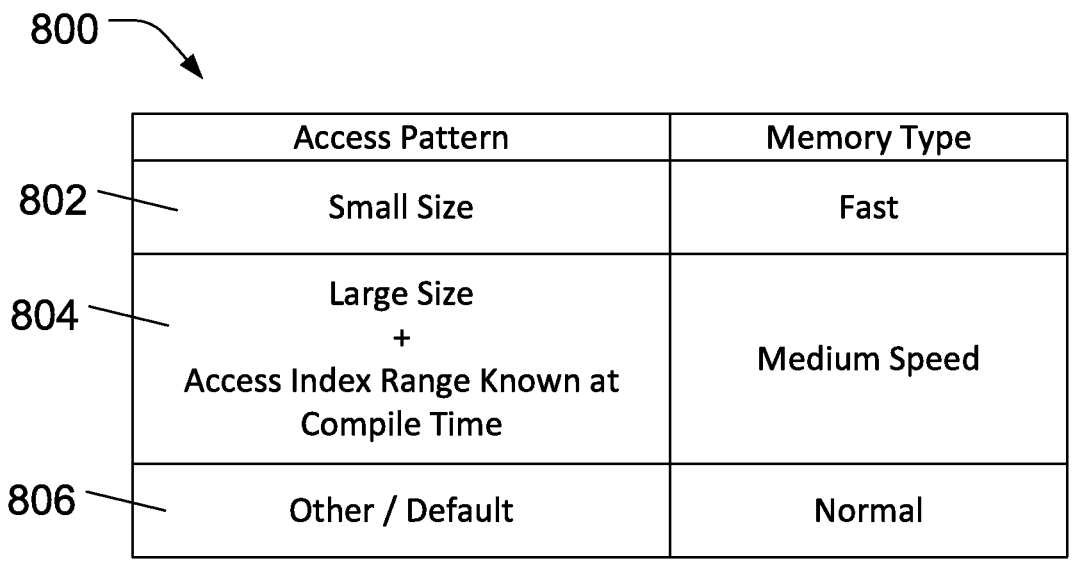
FIGS. 8A and 8B show which type of constant memory may be selected by the constant memory optimizer of the disclosure, depending on the access pattern of the constant.

Having explained the types of memory to which constants may be assigned, the operation of the memory type determination module 630 is now explained with reference to FIGS. 8A and 8B. In FIG. 8A, in the first case, in which the scope of the constant is the program scope or the outermost scope of a kernel, the size of the constant will be known, and the table 800 of sub-cases shown in FIG. 8A may be applied to determine the type of memory that should be used to store the constant.

In a "small-size" sub-case 802, if the constant is sufficiently small for placement in the fast memory (a determination that will depend on the size of the fast memory, as explained above), then the memory type determination module 630 will select fast memory, such as registers, to store the constant. Because the entire constant is relatively small in size, in some implementations, this can be done regardless of the access index range or access pattern.

In a "program scope known access range" sub-case 804, if the constant is large (i.e., the small-size sub-case 802 could not place the entire constant in fast memory) and the access index range is known at compile-time (i.e., the access pattern determination module 620 was able to determine the access index range), then the memory type determination module 630 will select medium-speed memory, such as on-chip shared or local memory, for the constant. In this sub-case 804, it will be understood that because the access index range for the constant is known, only the portions of the constant that are within the access index range need actually be transferred to and stored in the medium-speed memory. Thus, what is meant by selecting medium-speed memory for the constant is that those portions of the constant that are within the known access index range will be stored in the medium-speed memory at run-time. This provides an advantage in that there will be less data that needs to be moved from the host or global memory to the medium-speed memory at run-time, and the portions of the constant that are within the known access index range will use less of the limited space in the medium-speed memory than would the entire constant. Further, there may be instances where the whole constant is too large to be placed in the medium-speed memory, but the portions of the constant within the access index range can be placed there. It should be noted that in some implementations, if the access index range is sufficiently small, then the fast memory could be selected for the portions of the constant that are within the access index range.

Finally, in the "default" sub-case 806, if the constant was not sufficiently small to be placed in fast memory, and the access index range is not known at compile-time (i.e., the access pattern determination module 620 was not able to determine the access index range), then the memory type determination module 630 selects for the constant the normal memory used for constants. In many cases, this will be global memory or constant memory (a portion of global memory), and access may be relatively slow. It should be noted, however, that this is generally no worse than would be the case without the use of the optimizer 522.

Figure 8B:
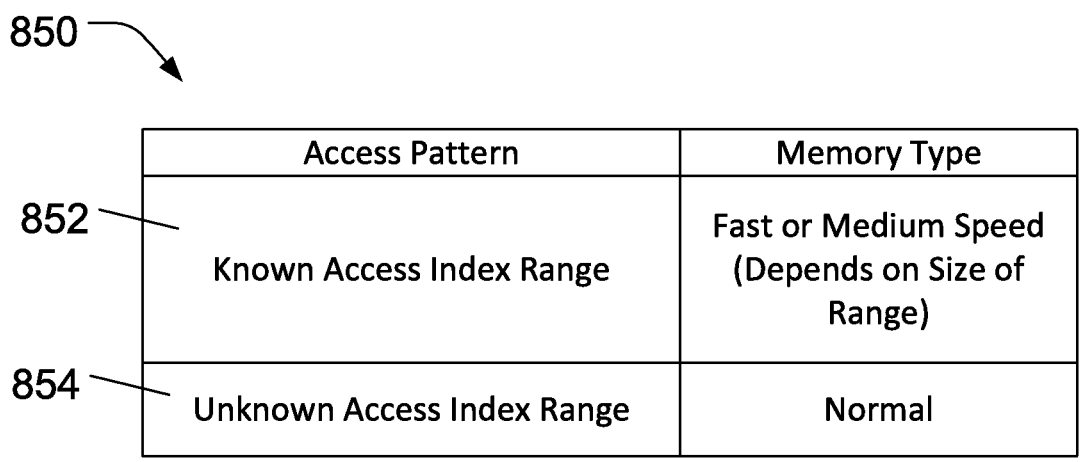

FIG. 8B shows memory type selection in the second case, in which the constant is a constant pointer argument to a kernel. Table 850 shows the sub-cases that can be applied. Because the size of the constant will not be known if the constant is a constant pointer argument, in this case, the size of the constant cannot be used to determine the memory type.

In a "constant pointer known access" sub-case 852, the memory type determination module 630 selects either fast or medium-speed memory if the access index range is known at compile-time (i.e., the access pattern determination module 620 was able to determine the access index range). If the portion of the constant within the access index range is sufficiently small for placement in the fast memory, then the memory type determination module 630 will select fast memory for the constant. As above, this means that those portions of the constant that are within the access index range will be stored in fast memory at run-time.

If the portion of the constant that is within the access index range is not sufficiently small for placement in fast memory, then the memory type determination module 630 will select medium-speed memory for the constant. This means that those portions of the constant that are within the access index range will be stored in medium-speed memory at run-time. It will be understood that there may be instances in which the portion of the constant that is within the access index range is too large for medium-speed memory. Should this happen, then the constant is simply stored in the normal memory that is used to store constants.

In a constant pointer unknown access sub-case 854, if the access index range for a constant pointer argument is not known at compile-time (i.e., the access pattern determination module 620 was not able to determine the access index range), then the memory type determination module 630 selects for the constant the normal memory used for constants. In many cases, this will be global memory or constant memory (a portion of global memory), and access may be relatively slow. As explained above, this is generally no worse than would be the case without the use of the optimizer 522.

Referring back again to FIG. 6, once a memory type has been selected for the constant, the code should be transformed to reflect this decision. This is handled by the code transformation module 640.

If the constant is a program scope constant or a constant in the outermost scope of the kernel, then greater flexibility may be needed for placement of the constant in a memory other than the normal memory in which constants are stored. In accordance with an aspect of the technology disclosed herein, this flexibility can be achieved by handling such constant values as an implicit argument for the kernels in which they are visible. This means that for a program scope constant, the constant is potentially passed into each kernel as an implicit argument. For a constant in the outermost scope of a kernel, the constant should be passed as an implicit argument into the kernel in which it is in the outermost scope. Advantageously, this changes these constant values in the code, which would ordinarily be placed into a predetermined data segment—typically constant memory—into pointers to constants. A pointer to a constant is not much different from any other pointer and can point to any memory type. In the case in which the constant is a constant pointer argument, there is no need to handle the constant as an implicit argument, since it is already an explicit argument to a kernel, and is already a pointer to a constant.

The code transformation module 640 uses the selected memory type to change the memory type of the constant and to propagate this change to the places in the code where the constant is used. In some implementations, this may primarily be a matter of changing the memory type that is pointed to by a pointer to a constant and arranging the code so that the constant will be moved to that memory type at run-time. In some implementations, the code transformation module 640 may apply further transformations of the intermediate representation, such as applying offsets to access indices where portions of a constant in an access index range are stored in the selected memory type.

Additionally, the code transformation module 640 may provide information on memory type selections to the code generator module 530, to instruct the code generator module 530 to use the proper assembly or machine code instructions to access selected types of memory. In the case of an OpenCL implementation, the information provided to the code generator module 530 may be used to mark the assembly to notify the OpenCL driver of the memory placement decision for the constant.

It is to be understood that the operations and functionality of the constant memory optimizations described herein, while shown with OpenCL and with example code written in the OpenCL C programming language, could be used with other heterogeneous parallel computing systems and architectures, and with other programming languages. In general, the technology disclosed herein could be used with almost any programming language that constant data, and may also be applied in some instances to static data (i.e., data that exists throughout the entire execution of a program but can be changed at run-time). Because static data may be modified at run-time, extra analysis may be needed to check whether the static memory is changed, or is "load-only" memory (i.e., it is loaded or initialized at run-time, but does not change thereafter). If it is not, then it may be necessary for the compiler to analyze memory dependency to guarantee data correctness.

It will also be understood that, although the embodiments presented herein have been described with reference to specific features and structures, various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. An apparatus comprising:
a processor;
a memory coupled to the processor; and
a compiler residing in the memory and executed by the processor, the compiler including a constant memory optimizer configured to place constant data into a plurality of types of memory, the constant memory optimizer comprising:
a scope determination module configured to determine a scope of a constant in code for a heterogeneous parallel computer;
a code transformation module configured to transform the code to pass the constant as an implicit pointer argument to a kernel in the code that references the constant if the scope of the constant is a program scope or an outermost scope of the kernel; and
an access pattern determination module configured to determine an access pattern of the constant in the kernel,
wherein the optimizer defines at least a first case in which the scope of the constant is the program scope or the outermost scope of the kernel, and at least a second case in which the constant is a constant pointer argument, and
wherein the access pattern determination module is further configured to determine a size of the constant, such that the first case includes a corresponding plurality of sub-cases directed to memory speed based on the constant size and the second case includes a corresponding plurality of sub-cases directed to the memory speed based on the access pattern of the constant.

2. The apparatus of claim 1, wherein the constant memory optimizer further comprises a memory type determination module configured to select a type of memory to be used for the constant based on the access pattern.

3. The apparatus of claim 2, wherein the code transformation module is further configured to transform the code to use the selected type of memory for the constant.

4. The apparatus of claim 2, wherein the corresponding plurality of sub-cases for the first case includes:
a small-size sub-case, in which the memory type determination module is configured to select a fast memory for the constant if the size of the constant is sufficiently small for placement in the fast memory;
a program scope known access range sub-case, in which the memory type determination module is configured to select a medium-speed memory for the constant if the size of the constant is too large for placement in the fast memory and if the access pattern includes a known access index range at compile-time; and
a default sub-case, in which the memory type determination module is configured to select a normal type of memory used for constants if neither the small-size sub-case nor the program scope known access range sub-case applies.

5. The apparatus of claim 4, wherein the fast memory comprises registers.

6. The apparatus of claim 4, wherein the medium-speed memory comprises on-chip memory in a compute device.

7. The apparatus of claim 2, wherein the corresponding plurality of sub-cases for the second case includes:
a constant pointer known access sub-case, in which the memory type determination module is configured to select a fast memory for a known access index range of the constant if the access pattern includes the known access index range at compile-time and a size of the known access index range is sufficiently small for placement in the fast memory, and in which the memory type determination module is configured to select a medium-speed memory for the known access index range of the constant if the access pattern includes the known access index range at compile-time and the size of the known access index range is too large for placement in the fast memory; and
a constant pointer unknown access sub-case, in which the memory type determination module is configured to select a normal type of memory used for constant values if the access pattern does not include a known access index range at compile-time.

8. The apparatus of claim 1, wherein the heterogeneous parallel computer supports OpenCL.

9. The apparatus of claim 8, wherein the code transformation module is configured to transform code expressed in an OpenCL intermediate representation.

10. The apparatus of claim 1, wherein a compute device of the heterogeneous parallel computer lacks an on-chip constant memory.

11. A method of optimizing access to constants in a heterogeneous parallel computer comprising:
determining a scope of a constant in code for the heterogeneous parallel computer using a scope determination module;
transforming the code to pass the constant as an implicit pointer argument to a kernel in the code that references the constant if the scope of the constant is a program scope or is an outermost scope of the kernel, the transforming performed using a code transformation module;
determining an access pattern of the constant in the kernel and a size of the constant using an access pattern determination module; and
selecting a type of memory from a plurality of types of memory to be used for the constant based on the access pattern, the selecting performed using a memory type determination module,
wherein transforming the code further comprises transforming the code to use the selected type of memory for the constant,
wherein for a first case, in which the scope of the constant is the program scope or is the outermost scope of the kernel, the selecting of the type of memory includes selecting from a plurality of sub-cases directed to memory speed based on the constant size, and
wherein for a second case, in which the constant is a constant pointer argument, the selecting of the type of memory includes selecting from a plurality of sub-cases directed to memory speed based on the access pattern of the constant.

12. The method of claim 11, wherein for the first case in which the scope of the constant is the program scope or is the outermost scope of the kernel,
the selecting of the type of memory to be used from the plurality of sub-cases directed to memory speed based on the constant size comprises:
selecting a fast memory for the constant in a small-size sub-case if the size of the constant is sufficiently small for placement in the fast memory;
selecting a medium-speed memory for the constant in a program scope known access range sub-case if the size of the constant is too large for placement in the fast memory and if the access pattern includes a known access index range at compile-time; and
selecting a normal type of memory used for constants in a default sub-case if neither the small-size sub-case nor the program scope known access range sub-case applies.

13. The method of claim 12, wherein selecting the fast memory comprises selecting registers to store the constant.

14. The method of claim 12, wherein selecting the medium-speed memory comprises selecting on-chip memory in a compute device to store the constant.

15. The method of claim 11, wherein for the second case, in which the constant is a constant pointer argument, the selecting of the type of memory to be used from the plurality of sub-cases directed to memory speed based on the access pattern of the constant comprises:
selecting a fast memory or a medium-speed memory in a constant pointer known access sub-case, in which the fast memory is selected for a known access index range of the constant if the access pattern includes the known access index range at compile-time and a size of the known access index range is sufficiently small for placement in the fast memory, and in which the medium-speed memory is selected for the known access index range of the constant if the access pattern includes the known access index range at compile-time and the size of the known access index range is too large for placement in the fast memory; and
selecting a normal type of memory used for constant values in a constant pointer unknown access sub-case if the access pattern does not include a known access index range at compile-time.

16. The method of claim 11, wherein the heterogeneous parallel computer supports OpenCL.

17. The method of claim 16, wherein transforming the code further comprises transforming code expressed in an OpenCL intermediate representation.

18. A non-transitory computer-readable medium comprising instructions that, when executed by a processor, cause the processor to:
determine a scope of a constant in code for a heterogeneous parallel computer;
determine a size and an access pattern of the constant in a kernel in the code;
select a type of memory to be used for the constant based on the size and access pattern by:
in a first case in which the scope of the constant is a program scope or an outermost scope of the kernel:
selecting a fast memory for the constant in a small-size sub-case if the size of the constant is sufficiently small for placement in the fast memory;
selecting a medium-speed memory for the constant in a program scope known access range sub-case if the size of the constant is too large for placement in the fast memory and if the access pattern includes a known access index range at compile-time; and
selecting a normal type of memory used for constants in a default sub-case if neither the small-size sub-case nor the program scope known access range sub-case applies; and in a second case, in which the constant is a constant pointer argument:

selecting a fast memory or a medium-speed memory in a constant pointer known access sub-case, in which the fast memory is selected for a known access index range of the constant if the access pattern includes the known access index range at compile-time and a size of the known access index range is sufficiently small for placement in the fast memory, and in which the medium-speed memory is selected for the known access index range of the constant if the access pattern includes the known access index range at compile-time and the size of the known access index range is too large for placement in the fast memory; and selecting a normal type of memory used for constant values in a constant pointer unknown access sub-case if the access pattern does not include a known access index range at compile-time; and transform the code to pass the constant as an implicit pointer argument to a kernel in the code that references the constant if the scope of the constant is a program scope or an outermost scope of the kernel and to use the selected type of memory for the constant.

* * * * *